(12) United States Patent
Dai

(10) Patent No.: US 6,730,623 B2
(45) Date of Patent: May 4, 2004

(54) COFIREABLE DIELECTRIC COMPOSITION

(75) Inventor: Xunhu Dai, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 4 days.

(21) Appl. No.: 10/256,931

(22) Filed: Sep. 27, 2002

(65) Prior Publication Data

US 2004/0063565 A1 Apr. 1, 2004

(51) Int. Cl.$^7$ ............................................. C04B 35/495
(52) U.S. Cl. ........................................ 501/134; 501/32
(58) Field of Search .................................. 501/134, 32

(56) References Cited

U.S. PATENT DOCUMENTS

| | | | | |
|---|---|---|---|---|
| 5,449,652 A | * | 9/1995 | Swartz et al. ............... | 501/134 |
| 5,801,108 A | * | 9/1998 | Huang et al. ................ | 501/32 |
| 6,395,663 B1 | * | 5/2002 | Chen et al. .................. | 501/134 |

* cited by examiner

Primary Examiner—Karl Group
(74) Attorney, Agent, or Firm—William E. Koch

(57) ABSTRACT

An exemplary composition of matter and method for making high-efficiency, low-loss capacitors is disclosed as including inter alia a $B_2O_3$—$Bi_2O_3$—ZnO glass in admixture with material typically comprising about 30–40 wt % cubic phase $(Bi_{0.5}Zn_{0.5})(Zn_{0.5}Nb_{1.5})O_7$ and about 60–70 wt % pseudo-orthorhombic phase $Bi_2(Zn_{1/3}Nb_{1/3})_2O_7$ (e.g., "BZN"). The mixture effectively reduces the sintering temperature of BZN from the range of about 950–1050° C. to the range of about 850–900° C., thereby rendering BZN suitable for cofiring with, for example, existing LTCC dielectrics. Disclosed features and specifications may be variously controlled, configured, adapted or otherwise optionally modified to further improve or otherwise optimize the sintering temperature of BZN and/or BZN-based materials. Exemplary embodiments of the present invention representatively provide for embedded high-efficiency, low-loss capacitors that may be readily integrated with existing portable ceramic technologies for the improvement of dielectric properties, device package form factors, weights and/or other manufacturing, device or material performance metrics.

20 Claims, 2 Drawing Sheets

COFIREABLE DIELECTRIC COMPOSITION

FIELD OF INVENTION

The present invention relates to ceramic materials and methods of making the same, and more particularly, in one representative and exemplary embodiment, to a high K, high Q (e.g., low loss) composition for reducing the sintering temperature of BZN compositions in multilayer LTCC (e.g., Low Temperature Cofired Ceramic) applications.

BACKGROUND

The use of green ceramic tapes has become popular in the manufacture of multilayer ceramic devices for routing electronic circuitry. For example, U.S. Pat. No. 5,801,108 discloses various engineering constraints typically encountered in the manufacture of such devices. Traditionally, many electronic components such as capacitors and resistors are surface mounted onto multilayer ceramic substrates. The processes typically involved in the fabrication of such circuitry can often be expensive, time consuming and/or labor intensive. Desirably, such devices may exhibit attractive values of "Q"—a dimensionless metric that is inversely proportional to the efficiency factor of a given material (e.g., higher Q values generally correspond to lower loss).

One way to produce such multilayer ceramic packages involves the building-up of ceramic green tape layers using a paste of a desired material, such as a suitably adapted particulate material suspended in a binder. Upon processing, the binder may be effectively eliminated with the residual particulates of the desired material thereafter sintered to generally form a more densified structure.

$Bi_2O_3$—$ZnO$—$Nb_2O_5$ typically demonstrates unique dielectric properties. Between about 1–5 GHz, the cubic phase $(Bi_{0.5}Zn_{0.5})(Zn_{0.5}Nb_{1.5})O_7$ generally has a dielectric constant on the order of about K=140 with a temperature coefficient of capacitance of around $T_c$=−400 ppm/° C. The pseudo-orthorhombic phase $Bi_2(Zn_{1/3}Nb_{1/3})_2O_7$ generally has a dielectric constant of about K=80 and a temperature coefficient of capacitance of about $T_c$=+200 ppm/° C. Accordingly, a mixture of the two phases at a proper ratio may be exploited to produce relatively low $T_c$ dielectric compositions. Typical ranges that have been previously characterized are between about 30–40 wt % cubic $(Bi_{0.5}Zn_{0.5})(Zn_{0.5}Nb_{1.5})O_7$ phase and between about 60–70 wt % pseudo-orthorhombic $Bi_2(Zn_{1/3}Nb_{1/3})_2O_7$ phase; this mixture hereafter referred to as "BZN". Dielectrics within this composition range typically have K on the order of about 90–95 with Q values greater than or equal to about 500 as measured in the 0.5–1.0 GHz frequency band. However, the sintering temperature of such dielectrics is typically on the order of 950–1050° C. —generally much higher than the desired sintering temperature for most Low Temperature Cofired Ceramics (LTCC).

There is a need for improved cofireable dielectric compositions for making BZN-based devices; preferably materials that have relatively flexible processing characteristics and exhibit an attractive dielectric constant (e.g., K) and Q value. Specifically, there exists a need to provide a dielectric composition and method of making such materials and multilayer substrates that demonstrates the characteristics necessary for economical use in, for example, RF device applications while avoiding the processing limitations otherwise inherent in the prior art. Moreover, the material should be easily and reproducibly fabricated or otherwise amenable to manufacturing methods that produce device packages with consistent electrical and/or mechanical properties. Accordingly, despite the best efforts of the prior art, there is a need for improved dielectric compositions for effectively reducing the sintering temperature of BZN.

SUMMARY OF THE INVENTION

In various representative aspects, the present invention provides a composition of matter and method of using a glass sintering aid to reduce the sintering temperature of BZN. A representative application of the disclosed technology provides high K, low loss cofireable dielectric compositions for the manufacture of embedded capacitors in LTCC packages.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods, compositions or combinations particularly pointed out in the Claims.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Figure 1:
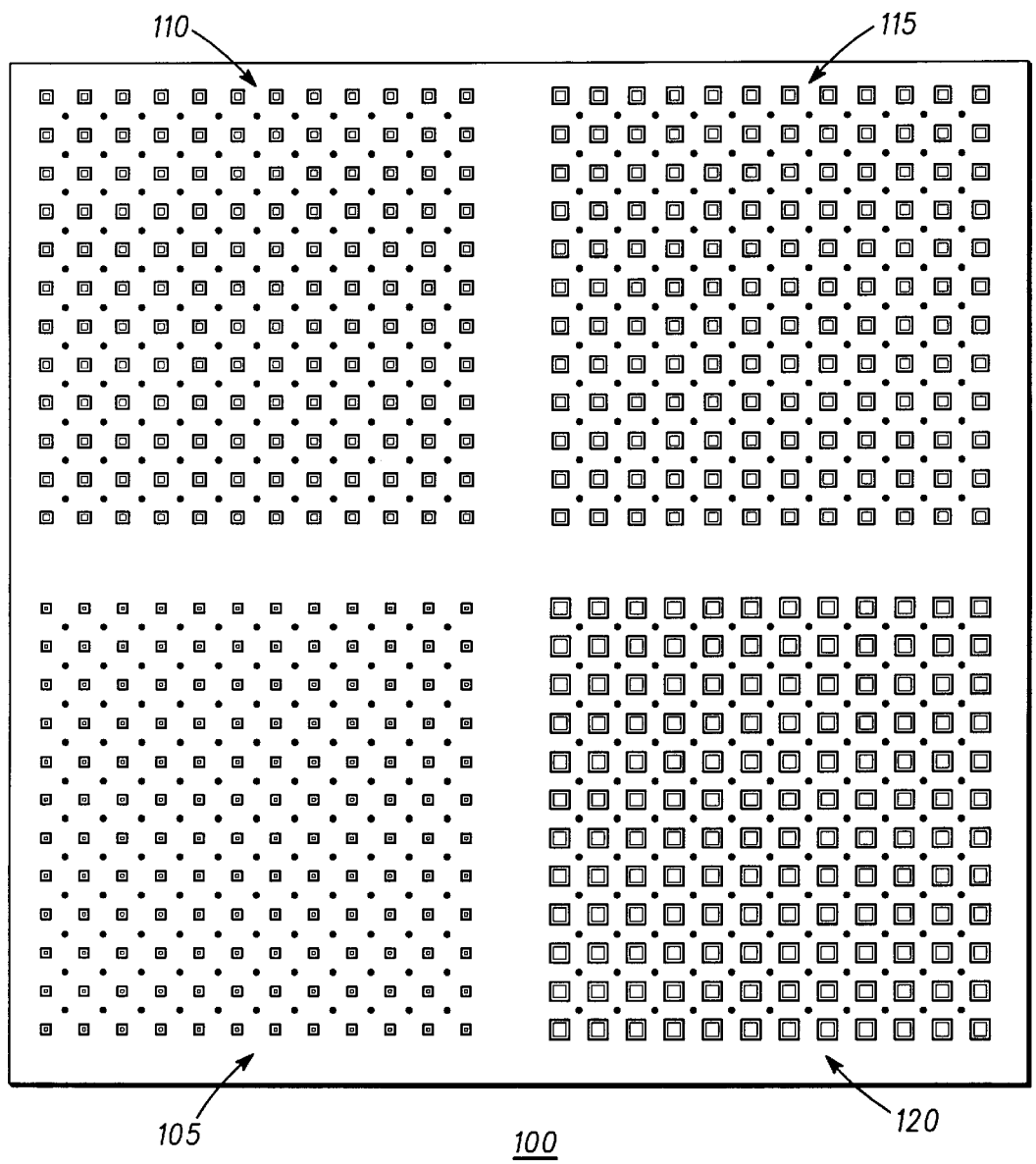
FIG. 1 representatively depicts the dielectric layer of a capacitor testing array in accordance with an exemplary embodiment of the present invention.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following descriptions are of exemplary embodiments of the invention and the inventor's conception of the best mode and are not intended to limit the scope, applicability or configuration of the invention in any way. Rather, the following description is intended to provide convenient illustrations for implementing various embodiments of the invention. As will become apparent, changes may be made in the composition, function and/or arrangement of any of the elements described in the disclosed exemplary embodiments without departing from the spirit and scope of the invention.

Various representative implementations of the present invention may be applied to any system and/or method for reducing the sintering temperature of BZN and/or BZN-based materials. As used herein, the terms "sintering", "firing", "cofiring" and/or any contextual, variational or combinative referent thereof, are generally intended to include any process the result of which generally causes material to form a coherent mass upon application of thermal energy without melting of the material, whether now known or hereafter discovered or otherwise described in the art. As used herein, the term "dielectric", as well as any contextual or combinative referent or variant thereof, is generally intended to connote any material which may be characterized as demonstrating the properties of a nonconductor of direct electric current.

A detailed description of an exemplary application, namely a glass sintering aid composition and method for reducing the cofiring temperature of BZN is provided as a specific enabling disclosure that may be readily generalized by skilled artisans to any application of the disclosed system and method. Moreover, skilled artisans will appreciate that the principles of the present invention may be employed to ascertain and/or realize any number of other benefits associated with ceramic processing such as, but not limited to: improvement of capacitor efficiency; reduced capacitor loss; reduction of sintering temperatures; reduction of device form factor; improved production throughput; improved integration of capacitor elements; reduction of manufacturing costs; and any other applications now known or hereafter developed or otherwise described in the art.

In one representative application, in accordance with an exemplary embodiment of the present invention, $B_2O_3$—$Bi_2O_3$—$ZnO$ glass is placed in admixture with material comprising between about 30–40 wt % cubic phase $(Bi_{0.5}Zn_{0.5})(Zn_{0.5}Nb_{1.5})O_7$ and between about 60–70 wt % pseudo-orthorhombic phase $Bi_2(Zn_{1/3}Nb_{1/3})_2O_7$. The mixture is then cofired between about 850° C. and 900° C. to produce a substantially sintered composite structure. In one representative and exemplary embodiment, the $B_2O_3$—$Bi_2O_3$—$ZnO$ glass may preferably comprise about 0.25% to about 5.0% by weight; and more preferably, about 0.75% to about 1.5% by weight. In another exemplary embodiment, the composition of the $B_2O_3$—$Bi_2O_3$—$ZnO$ glass may comprise, for example, up to about 96% of $3B_2O_3$—$Bi_2O_3$ by weight and about 4% of $B_2O_3$—$3ZnO$ by weight. Optionally, the mixture may also be cofired with various existing LTCC dielectrics, such as, for example, HERAEUS-CT2000 (available from W. C. Heraeus GmbH & Co., KG, Heraeusstraβe 12–14, D-63450 Hanau, Germany) or DuPONT-951 "Green Tape™" (available from DuPont Microcircuit Materials, E. I. Du Pont de Nemours and Company, 14 T. W. Alexander Drive, Research Triangle Park, N.C., USA).

A composition of $B_2O_3$—$Bi_2O_3$—$ZnO$ glass in admixture with material comprising between about 30–40 wt % cubic phase $(Bi_{0.5}Zn_{0.5})(Zn_{0.5}Nb_{1.5})O_7$ and between about 60–70 wt % pseudo-orthorhombic phase $Bi_2(Zn_{1/3}Nb_{1/3})_2O_7$ (e.g., "BZN") was tested in a standard package 6×6 array with four quadrants in each package. FIG. 1 representatively depicts the dielectric layer of one such standard package 100 with each quadrant comprising a 12×12 array of capacitors. The southwest quadrant 105 comprises 30 mil×30 mil areas filled with the above identified Bi(Zn, Nb)O low-fire dielectric paste in accordance with the present invention; the northwest quadrant 110, 40 mil×40 mil; the northeast quadrant 115, 50 mil×50 mil; and the southeast quadrant 120, 60 mil×60 mil. Each capacitor typically connects to an external electrode through, for example, vias on each side of the dielectric layer 100 from the centered positions. Variations of capacitors along the rows and columns of the arrays were measured to characterize the print uniformity both parallel and perpendicular to the print direction. DuPONT-6142 Ag (available from DuPont Microcircuit Materials, E. I. Du Pont de Nemours and Company, 14 T. W. Alexander Drive, Research Triangle Park, N.C., USA) was used for both the internal and external conductors. The dried thickness of the dielectric layer 100 was measured to be approximately 1.2 mil using double prints with a 285 screen mesh and 0.5 mil emulsion.

Figure 2:
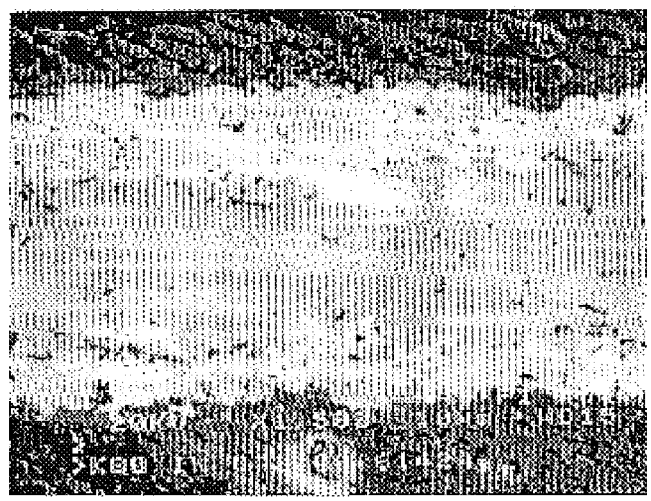
FIG. 2 representatively illustrates a cross-section of a capacitor in accordance with an exemplary embodiment of the present invention.

After sintering of the test array 100, the post-sintering thickness of the dielectric layer was observed to be about 20 $\mu$m as measure from an SEM cross-sectional image, as representatively depicted, for example, in FIG. 2. EDS analysis showed inclusions rich in Zn, Si and Al which comprise a minor phase which were determined to have minimal effect on the dielectric properties of the composite material.

Figure 3:
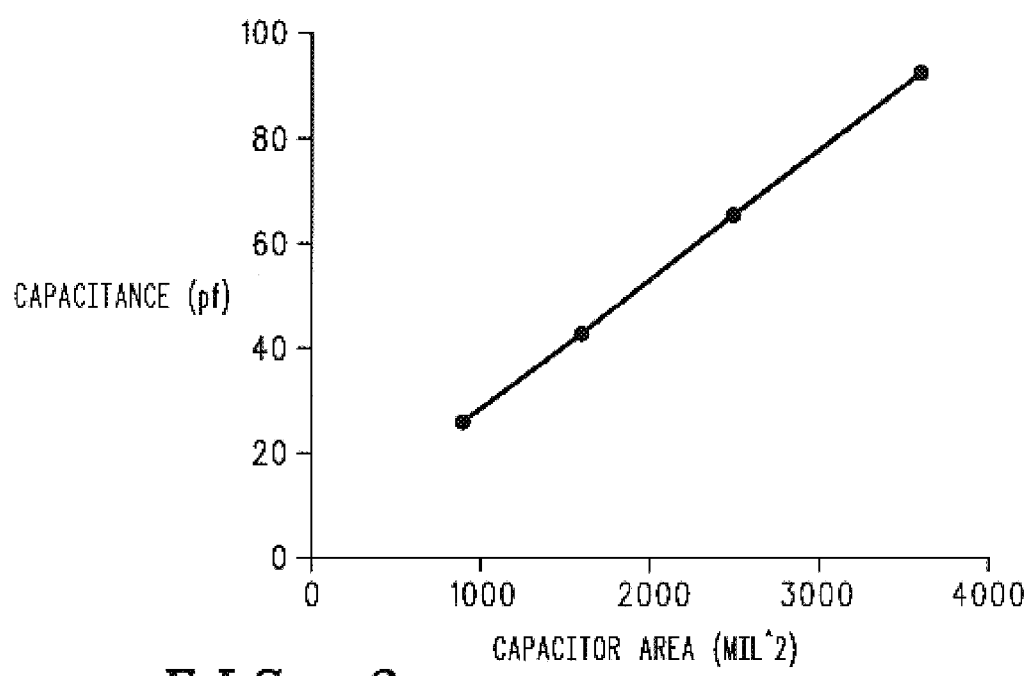
FIG. 3 representatively depicts capacitance data as a function of capacitor area in accordance with another embodiment of the present invention.

FIG. 3 representatively shows a plot of capacitance as a function of the normal surface area of the capacitors corresponding to the test array 100 depicted in FIG. 1. The profile shows a near linear correlation between the capacitance and the area, which is consistent with the calculation corresponding to that of a parallel plate capacitor. Given any capacitor value, skilled artisans may therefore calculate, estimate or otherwise characterize the capacitor area and/or geometry for specific applications and/or customized design criteria.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

What is claimed is:

1. A method for reducing the sintering temperature of BZN without substantial degradation of the dielectric properties of the same, the method comprising the steps of:
   providing a $B_2O_3$—$Bi_2O_3$—$ZnO$ glass in admixture with BZN; and
   cofiring the mixture.

2. The method for reducing the sintering temperature of BZN of claim 1, wherein said step of cofiring comprises the application of thermal energy corresponding to a temperature of about 850° C. to about 900° C.

3. The method for reducing the sintering temperature of BZN of claim 1, wherein said $B_2O_3$—$Bi_2O_3$—$ZnO$ glass is provided in the range of about 0.25% to about 5.0% by weight.

4. The method for reducing the sintering temperature of BZN of claim 3, wherein said $B_2O_3$—$Bi_2O_3$—$ZnO$ glass is provided in the range of about 0.75% to about 1.5% by weight.

5. The method of reducing the sintering temperature of BZN of claim 1, wherein said BZN comprises about 30% to about 40% by weight of cubic phase $Bi_{0.5}Zn_{0.5}$—$Zn_{0.5}Nb_{1.5}$—$O_7$ and about 60% to about 70% by weight of pseudo-orthorhombic phase $Bi_2$—$Zn_{1/3}Nb_{1/3}$—$2O_7$.

6. The method of reducing the sintering temperature of BZN of claim 1, wherein said $B_2O_3$—$Bi_2O_3$—$ZnO$ glass comprises up to about 96% by weight of $3B_2O_3$—$Bi_2O_3$ and about 4% by weight of $B_2O_3$—$3ZnO$.

7. The method for reducing the sintering temperature of BZN of claim 1, wherein said BZN and $B_2O_3$—$Bi_2O_3$—$ZnO$ glass admixture is cofired with an LTCC dielectric.

8. A method for forming a high efficiency, low loss embedded capacitor, the method comprising the steps of:
   providing a $B_2O_3$—$Bi_2O_3$—$ZnO$ glass in admixture with BZN; and
   cofiring the mixture with an LTCC dielectric to form at least one embedded capacitor.

9. The method for forming a capacitor of claim 8, wherein said step of cofiring comprises the application of thermal energy corresponding to a temperature of about 850° C. to about 900° C.

10. The method for forming a capacitor of claim 8, wherein said $B_2O_3$—$Bi_2O_3$—$ZnO$ glass is provided in the range of about 0.25% to about 5.0% by weight.

11. The method for forming a capacitor of claim 10, wherein said $B_2O_3$—$Bi_2O_3$—$ZnO$ glass is provided in the range of about 0.75% to about 1.5% by weight.

12. The method for forming a capacitor of claim 8, wherein said BZN comprises about 30% to about 40% by weight of cubic phase $Bi_{0.5}Zn_{0.5}$—$Zn_{0.5}Nb_{1.5}$—$O_7$ and about 60% to about 70% by weight of pseudo-orthorhombic phase $Bi_2$—$Zn_{1/3}Nb_{1/3}$—$2O_7$.

13. The method for forming a capacitor of claim 8, wherein said $B_2O_3$—$Bi_2O_3$—$ZnO$ glass comprises up to about 96% by weight of $3B_2O_3$—$Bi_2O_3$ and about 4% by weight of $B_2O_3$—$3ZnO$.

14. A composition of matter for reducing the sintering temperature of BZN, said composition comprising a $B_2O_3$—$Bi_2O_3$—$ZnO$ glass in admixture with BZN.

15. The composition of matter of claim 14, wherein said admixture comprises about 0.25% to about 5.0% by weight $B_2O_3$—$Bi_2O_3$—$ZnO$.

16. The composition of matter of claim 15, wherein said admixture comprises about 0.75% to about 1.5% by weight $B_2O_3$—$Bi_2O_3$—$ZnO$.

17. The composition of matter of claim 14, wherein said BZN comprises about 30% to about 40% by weight of cubic phase $Bi_{0.5}Zn_{0.5}$—$Zn_{0.5}Nb_{1.5}$—$O_7$ and about 60% to about 70% by weight of pseudo-orthorhombic phase $Bi_2$—$Zn_{1/3}Nb_{1/3}$—$2O_7$.

18. The composition of matter of claim 14, wherein said $B_2O_3$—$Bi_2O_3$—$ZnO$ glass comprises up to about 96% by weight of $3B_2O_3$—$Bi_2O_3$ and about 4% by weight of $B_2O_3$—$3ZnO$.

19. The composition of matter of claim 14, wherein said $B_2O_3$—$Bi_2O_3$—$ZnO$ glass comprises about 96% by weight of $3B_2O_3$—$Bi_2O_3$ and up to about 4% by weight of $B_2O_3$—$3ZnO$.

20. The composition of matter of claim 14, further comprising a cofired LTCC dielectric.

* * * * *